J. A. BASSETT.
Carbureter.
No. 34,557.
Patented Mar. 4, 1862.
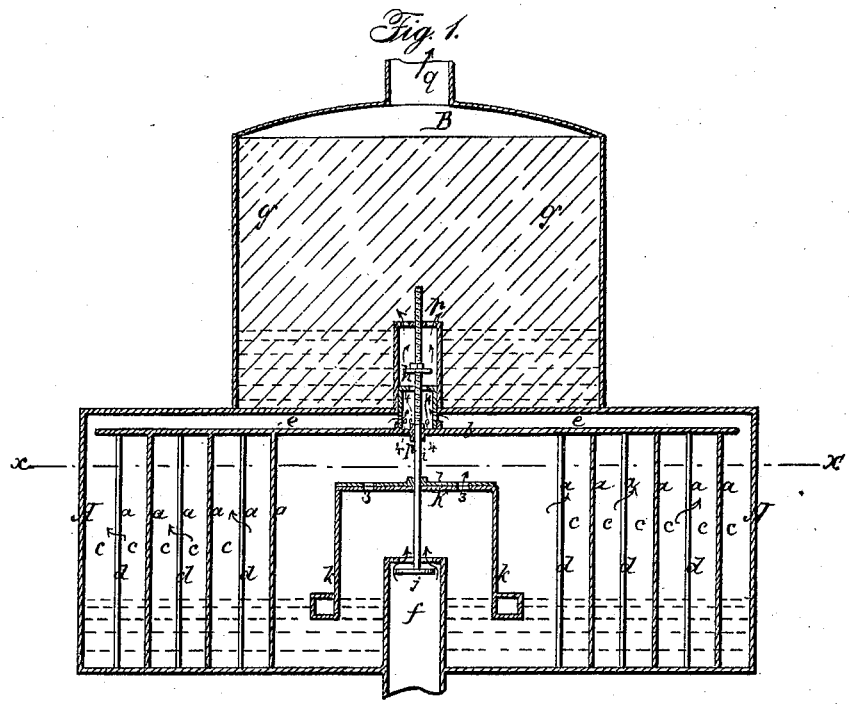
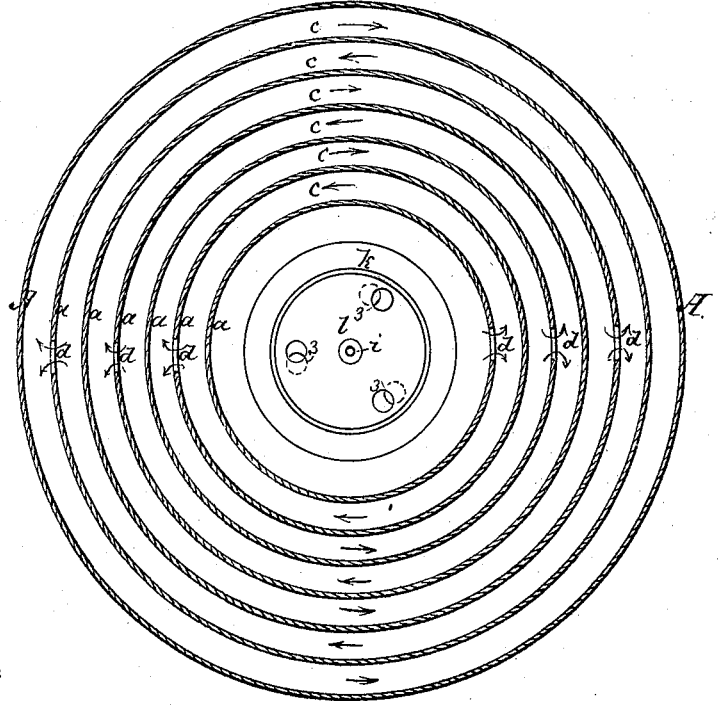
Witnesses:
Inventor:

UNITED STATES PATENT OFFICE.

JOHN A. BASSETT, OF SALEM, MASSACHUSETTS.

IMPROVED APPARATUS FOR CARBURETING GAS.

Specification forming part of Letters Patent No. 34,557, dated March 4, 1862.

*To all whom it may concern:*

Be it known that I, JOHN A. BASSETT, of Salem, in the county of Essex and State of Massachusetts, have invented a new and Improved Apparatus for Naphthalizing or Carbureting Illuminating-Gas and Regulating its Flow to Burners; and I do hereby declare that the following is a full, clear, and exact description of the same, reference being had to the accompanying drawings, forming part of this specification, in which—

Figure 1 is a vertical section of the apparatus. Fig. 2 is a horizontal section of the same in the plane indicated by the line $x\,x$, Fig. 1.

Similar letters of reference indicate corresponding parts in the two figures.

This apparatus consists of a vessel containing a series of annular passages arranged concentrically one within another around an upright axis and communicating with each other on opposite sides alternately, and a second vessel filled with a porous material arranged above the first-named vessel and communicating therewith by means of an interposed valve attached to the same stem, with an inverted cup-shaped float arranged in the lower vessel, and with a valve at the mouth of the inlet by which the gas enters the latter vessel from the main. Both of the vessels contain naphtha or other volatile hydrocarbon liquid, and the lower vessel serves partly to effect the naphthalizing process, but mainly as a cooler to cool the gas before its advent to the upper vessel, in which the naphthalizing is mainly performed and completed. The regulation of the flow of gas is effected by the inverted cup and the valve at the inlet, and the valve interposed between the two vessels serves, by nearly shutting off the gas when the liquid in the lower vessel gets very low, to give notice that the said vessel requires replenishing.

To enable others skilled in the art to make and use my invention, I will proceed to describe it.

A is the lower vessel, which we will call the "cooler," of circular form, containing a number of upright cylinders $a\,a$, arranged concentrically one within the other and covered by a plate $b$, to make them form the series of annular passages $c\,c$. The cylinders $a\,a$ have openings $d\,d$ on opposite sides alternately to form communications between the passages $c\,c$ and to cause the gas entering the vessel A by the central inlet-pipe $f$ to circulate around the passages $c\,c$, as indicated by the arrows in Fig. 2, until it arrives at the sides of the said vessel, from whence it is free to pass to the space $e$ above the plate $b$. The inlet-pipe $f$, which brings the gas from the main, projects upward some distance into the vessel, in order that the naphtha or other liquid placed in the vessel for cooling and partly carbureting the gas may not flow down the said pipe. This liquid occupies the lower parts of all the passages $c\,c$, so that the gas in passing through the vessel A passes over its whole surface.

B is the upper vessel, which we will term the "carburetor," of cylindrical or other form, arranged on the top of the cooler A and filled with a porous substance $g\,g$, which is kept saturated with naphtha or other volatile hydrocarbon liquid by capillary attraction so long as a supply of the liquid is kept up in the vessel. Various porous substances might be used in the said vessel B; but I propose to use the compound sometimes used in filters, known as "porous carbon." The substance is made of coke, pumice-stone, sawdust, asbestus, and coal-tar, mixed and calcined. To make this compound, take, by weight, of cannel-coke, pulverized, twelve (12) parts; pumice-stone, pulverized, eight (8) parts; asbestus, pulverized, two (2) parts; sawdust, fourteen (14) parts; coal-tar, four (4) parts. Mix and mold into proper form to fit the interior of the carburetor B and calcine at a white heat.

$h$ is the valve interposed between the cooler and carburetor, opening upward. $i$ is the valve-stem, to which are attached firmly the said valve $h$, the gas-regulating valve $j$, and the inverted cup or float $k$. $p\,p$ are guides for the said stem. The regulating-valve $j$ is at the mouth of the inlet-pipe $f$ and opens downward. The cup or float $k$ covers the valve $j$ and the inlet-pipe $f$ and floats in the naphtha in the vessel A. The gas enters the vessel A through apertures 3 3 3 in the top of the cup $k$, which is fitted with a register-valve $l$ to give a greater or less amount of opening to the said apertures, according to the supply of gas desired. The pressure of the gas against the top of the cup $k$ tends to lift it, and according as the pressure is less or greater the cup is more or less raised and the opening of the regulating-valve $j$ more or less reduced to regulate the supply under variations of pressure.

The valve $h$ works in a box $m$, which stands up within the carburetor B high enough to prevent any of the naphtha or other liquid from flowing down through the said valve. The gas reaches the said valve through openings 4 4 from the space $e$. The said valve is more or less open, according to the quantity of liquid in the lower vessel A, and when the said quantity becomes so small as to require replenishing the opening of the valve $h$ is so far contracted as to reduce the supply of gas to the burners sufficiently to produce a very sensible diminution in the volume of light.

The vessels A B are replenished through suitable openings in the tops or sides. The gas-outlet pipe $q$ leading to the burners is on the top of the vessel B.

The cooling process produced by the evaporation of the liquid, to which the gas is subject in passing through the cooler A prior to its advent to the carburetor B, is of immense advantage, as by cooling to the lowest practicable point before the completion of the carbureting process the said process is more perfectly performed, and no condensation takes place after the gas leaves the carburetor.

I do not claim the vessel A or its contained float $k$; but

What I claim as my invention, and desire to secure by Letters Patent, is—

1. The combination, substantially as herein described, of a vessel A, in which the gas passes circuitously over the surface of the hydrocarbon liquid to be partly carbureted and cooled by the evaporation of the liquid, and a vessel B, containing a porous substance and saturated with such liquid, through which the gas subsequently passes, as herein set forth.

2. The gas-regulating valve $j$ and float $k$, combined with a gas naphthalizing or carbureting apparatus, substantially as herein specified—that is to say, with the float floating in the naphtha or other hydrocarbon liquid used for the carbureting process.

JOHN A. BASSETT.

Witnesses:
JOHN R. NICHOLS,
GEO. B. APPLETON.